US006283154B1

(12) United States Patent
Rizk et al.

(10) Patent No.: US 6,283,154 B1
(45) Date of Patent: Sep. 4, 2001

(54) CONTROL VALVE FOR USE IN A RESERVOIR INJECTION SYSTEM FOR A DIESEL ENGINE

(75) Inventors: Reda Rizk, Cologne; Ulrich Augustin, Kernen; Raimondo Giavi, Munich, all of (DE)

(73) Assignee: Siemens Aktiengesellschaft AG, Munich (DE)

(*) Notice: Subject to any disclaimer, the term of this patent is extended or adjusted under 35 U.S.C. 154(b) by 0 days.

(21) Appl. No.: 09/514,266

(22) Filed: Feb. 28, 2000

(30) Foreign Application Priority Data

Feb. 26, 1999 (DE) ........................................ 199 08 418

(51) Int. Cl.[7] ........................ F02M 59/46; F16K 31/10

(52) U.S. Cl. ............. 137/625.65; 137/630; 251/129.16; 251/129.19

(58) Field of Search ........................ 251/129.19, 129.16; 137/625.65, 596.17, 630

(56) References Cited

U.S. PATENT DOCUMENTS 1,882,392 * 10/1932 Musgrave ........................ 137/630
5,038,826 * 8/1991 Kabai et al. ................ 137/625.65
5,396,926 * 3/1995 Pataki et al. ................ 137/596.17
5,407,131 4/1995 Maley et al. .
5,460,329 10/1995 Sturman .
5,497,806 * 3/1996 Swank et al. ................ 137/625.65
5,771,933 * 6/1998 Akamatsu et al. .......... 137/596.17 X
5,918,630 * 7/1999 Lucas et al. ................ 137/596.17

FOREIGN PATENT DOCUMENTS

0823550A1 2/1998 (EP) .
2157496 6/1973 (FR) .
1470166 4/1977 (GB) .

* cited by examiner

*Primary Examiner*—Kevin Shaver
*Assistant Examiner*—Eric Keasel
(74) *Attorney, Agent, or Firm*—Herbert L. Lerner; Laurence A. Greenberg; Werner H. Stemer

(57) ABSTRACT

A control valve contains a housing with an inlet connection, an outlet connection and a return connection. A first seat valve with a first valve body and a second seat valve with a second valve body are disposed in the housing. The first seat valve is disposed between the outlet connection and the return connection and is normally closed and the second seat valve is disposed between the inlet connection and the outlet connection and is normally open. The second valve body is disposed coaxially in the first valve body.

6 Claims, 1 Drawing Sheet

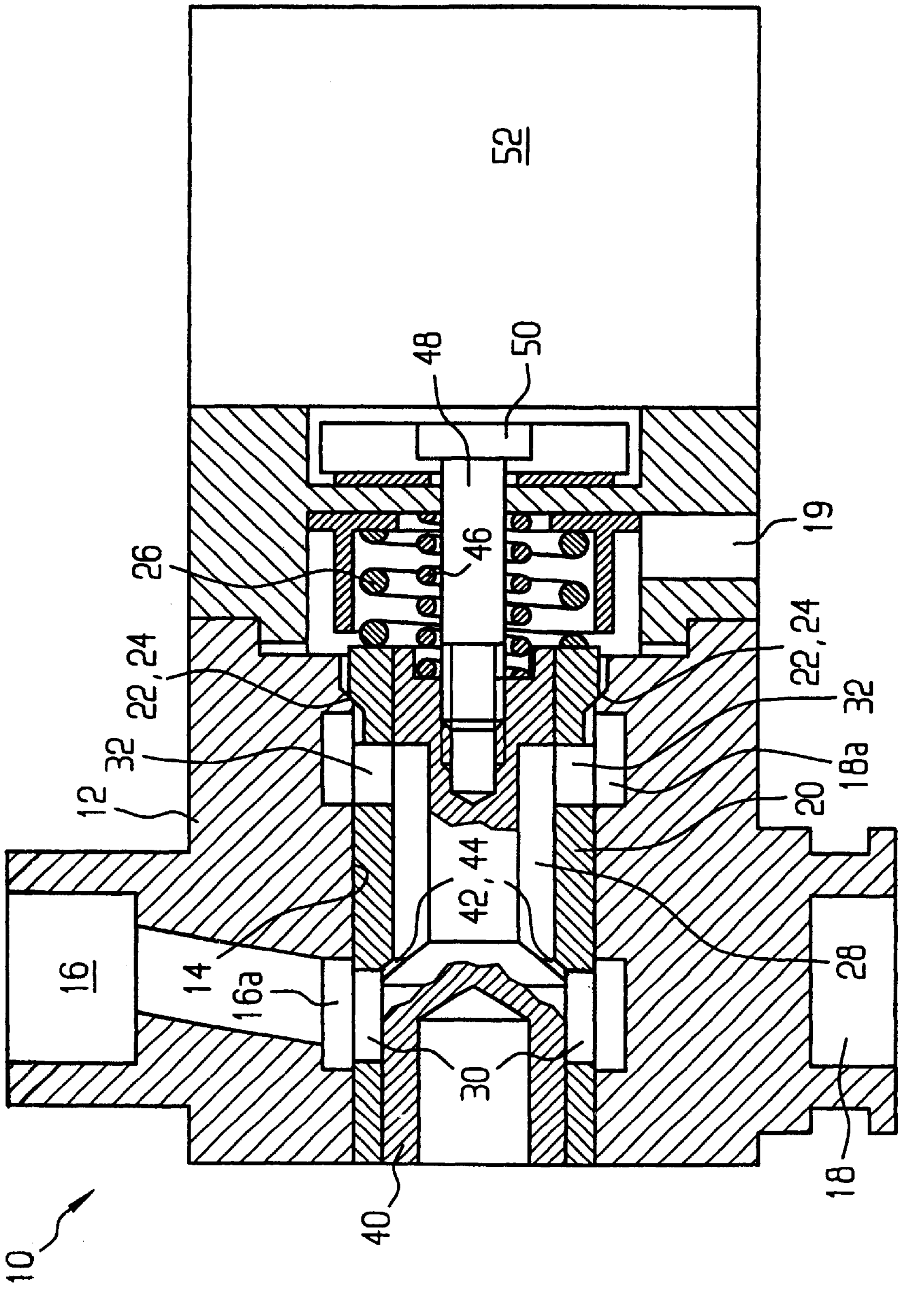
52
48
50
19
46
26
22,24
22,24
32
32
18a
12
20
42,44
14
16a
16
28
30
40
18
10

CONTROL VALVE FOR USE IN A RESERVOIR INJECTION SYSTEM FOR A DIESEL ENGINE

BACKGROUND OF THE INVENTION

Field of the Invention

The invention relates to a control valve for a reservoir injection system for diesel engines. The control valve has a housing with a valve chamber, an inlet connection, an outlet connection, a return connection and a first valve body disposed in the valve chamber. Such a configuration is known from U.S. Pat. No. 5,407,131.

A diesel engine with direct injection is the internal combustion engine with the highest thermodynamic efficiency. With respect to the fuel injection, different technologies are employed for various engines. Systems with pressure intensification in the fuel injector are used, particularly in the commercial vehicle sector. An example of a fuel injector with pressure-intensifying transmission is described in U.S. Pat. No. 5,460,329. In this publication, the fuel reaches the pressure intensifier in the injector via an electromagnetic control valve configured as a spool valve. The fuel is put under high pressure by the pressure intensifier at fixed times or crank angles by use of electromagnetic activation of the control valve. In the conventional manner, the fuel put under high pressure then acts in such a way that the valve needle of the injector is raised from its seat and frees the path for the fuel to the injection nozzle so that the fuel is injected into the combustion chamber of the diesel engine.

Another type of control valve for a fuel injector with a cam-operated pressure intensifier is described in U.S. Pat. No. 5,407,131. In this case, the control valve is a seat valve, which is normally open and which can be closed with the aid of an electromagnet. In the open condition, the fuel supplied from the tank by a low-pressure fuel feed pump flows back through the control valve to the tank.

Fuel injection into the combustion chamber of a cylinder of the diesel engine is initiated by an electrical or electronic engine control activating the electromagnet of the control valve. The magnetic force generated by the electromagnet causes the control valve to close. The fuel in the injector, which can no longer drain away, is consequently put under pressure by the cam-actuated piston of the pressure intensifier. The injection begins when the pressure has reached the specified nozzle needle opening pressure. The fuel injection is ended by the electromagnet no longer being supplied with current. After the collapse of the electromagnetic field, the seat valve opens again so that the fuel can again drain away and the pressure in the injector falls.

The opening and closing of the seat valve naturally takes place in correlation with the positions and movements of the piston in the cylinder of the engine and of the pressure intensifier piston of the injector, which is in mechanical connection with the crankshaft.

An injection pump appliance is known from British Patent Specification GB 1 470 166, which describes a control valve for use in a fuel reservoir injection system with a fuel injector, upstream of which is fitted the control valve. The control valve has a housing with a valve chamber, in which an inlet connection and an outlet connection and a return connection are provided. An axially movable, first valve body, which forms a first seat valve (which selectively creates a fluid connection between the outlet connection and the return connection), is disposed in the valve chamber. In addition, a second valve body, which forms a second seat valve, is provided in the valve chamber of the control valve.

The first seat valve is disposed between the outlet connection and the return connection and is normally closed. The second seat valve is disposed between the inlet connection and the outlet connection and is normally open.

The known configurations have the disadvantage that in the case of both the spool valves and the seat valves, the sealing function is insufficient. The spool valves are only insufficiently sealed over the sealing gap and, in the case of the seat valves, the sealing function is undertaken by the seat in one direction only.

SUMMARY OF THE INVENTION

It is accordingly an object of the invention to provide a control valve for use in a reservoir injection system for a diesel engine which overcomes the above-mentioned disadvantages of the prior art devices of this general type, in which the sealing function is improved.

With the foregoing and other objects in view there is provided, in accordance with the invention, a control valve for use in a fuel reservoir injection system having a fuel injector with a pressure intensifier fitted upstream of the control valve, the control valve including:

a housing having a valve chamber formed therein, an inlet connection, an outlet connection, and a return connection;

a first valve body disposed and axially movable in the valve chamber, the first valve body forming a first seat valve which can selectively create a fluid connection between, the outlet connection and the return connection; and a second valve body disposed in the valve chamber and forming a second seat valve, the first seat valve disposed between the outlet connection and the return connection and being normally closed, the second seat valve disposed between the inlet connection and the outlet connection and being normally open.

The above object is consequently achieved, in accordance with the invention, in that in the case of the control valve, which contains the housing with the valve chamber, the inlet connection, the outlet connection, the return connection and the first valve body which is axially movable in the valve chamber. The valve body forms a first seat valve that can selectively create a fluid connection between the inlet connection and the outlet connection or between the outlet connection and the return connection. The second valve body is provided and forms the second seat valve, the first seat valve is disposed between the outlet connection and the return connection and being normally closed and the second seat valve is disposed between the inlet connection and the outlet connection and being normally open.

The second valve body is advantageously configured coaxially in the first valve body. The second valve body can be connected to an armature plate, which is opposite to a magnet unit. In the case of an activation of the magnet unit, the second valve body moves first and closes the second seat valve before the first valve body, entrained by the second valve body, moves and opens the first seat valve.

The control valve according to the invention is, therefore, a pressure-balancing valve with two seat valves disposed one within the other. The two seat valves can be manufactured independently of one another. When the control valve is assembled, the two seat valves are then disposed in pairs and adjusted. The configuration provides the advantage of a functional improvement by pressure balance in each position of the valve. This minimizes the adjustment forces necessary. In addition, the two seat valves of the control valve according to the invention can be manufactured and adjusted independently of one another, so that the manufacture of the control valve is simple. The valve opening is variable, the two seat valves open and close one after the other and not together so that it is not necessary to take account of complex transition functions.

Other features which are considered as characteristic for the invention are set forth in the appended claims.

Although the invention is illustrated and described herein as embodied in a control valve for use in a reservoir injection system for a diesel engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a diagrammatic, sectional view through a control valve for a fuel injector.

DESCRIPTION OF THE PREFERRED EMBODIMENTS

Referring now to the single FIGURE of the drawing in detail, there is shown a diagrammatic, sectional view of a ⅔-type control valve 10 for use in a reservoir injection system for diesel engines. The injection system operates with fuel injectors having pressure intensifiers. Each cylinder of the diesel engine is provided with a fuel injector of this type.

The control valve 10 contains a valve housing 12 with a valve chamber 14. The housing 12 has an inlet connection 16 and an outlet connection 18. A fuel supply line from a non-illustrated pressure reservoir, which contains fuel at a certain pressure, is connected to the inlet connection 16. From the outlet connection 18, the fuel reaches, as required, the pressure intensifier of a non-illustrated fuel injector. In the valve housing 12, both the inlet connection 16 and the outlet connection 18 open into the valve chamber 14. In the embodiment shown of the control valve 10, the inlet connection 16 opens into a peripheral annular groove 16*a* in a wall of the valve chamber 14 and the outlet connection 18 opens into an annular groove 18*a* in the wall of the valve chamber 14. The annular groove 18*a* being at an axial distance from the annular groove 16*a*.

The valve housing 12 has, in addition, a return connection 19, which likewise opens into the valve chamber 14 and creates the connection to an unpressurized fuel return. The opening of the return connection 19 into the valve chamber 14 is spatially separated from the inlet and outlet connections 16, 18 or the annular grooves 16*a*, 18*a*.

A first valve body 20 is disposed in the valve chamber 14 so that it has limited axial movement. The first valve body 20 has a conical valve surface 22 in the form of a peripheral shoulder on the valve body 20, which valve surface 22 can come into contact with a valve seat 24, matched to it, in the form of a relief in the wall of the valve chamber 14. The contact between the valve surface 22 and the valve seat 24 is effected by a compression spring 26.

The valve surface 22 on the first valve body 20 and the valve seat 24 are disposed in such a way that when the valve surface 22 is raised from the valve seat 24, there is a fluid connection through the valve chamber 14 between the outlet connection 18 (or groove 18*a*) and the return connection 19. If the valve surface 22 is in contact with the valve seat 24, the fluid connection between the outlet connection 18 and the return connection 19 is interrupted by the first valve body 20. Together with the valve surface 22, which is formed on it, and the associated valve seat 24, the first valve body 20 therefore forms a first seat valve in the control valve 10. The first seat valve is disposed between the outlet connection 18 and return connection 19 and is normally closed.

A second valve body 40 is inserted coaxially into the first valve body 20. For this purpose, the first valve body 20 is provided with an internal cavity 28, into which the second valve body 40 is inserted in such a way that its axial movement is limited. The second valve body 40 has a conical valve surface 42 in the form of a peripheral shoulder on the valve body 40, which surface 42 can come into contact on a valve seat 44, matched to it, in the form of a relief in the wall of the cavity 28 in the first valve body 20.

The valve surface 42 on the second valve body 40 and the valve seat 44 are disposed in such a way that if the valve surface 42 is lifted from the valve seat 44, there is a fluid connection between the inlet connection 16 and the outlet connection 18. For this purpose, the wall of the first valve body 20 is provided (in the flow direction) with openings 30, 32 above and below the valve seat 44, through which openings 30, 32 the fuel can flow from the inlet connection 16 via the annular groove 16*a* into the cavity 34 and through which the fuel can flow out of the cavity 34 via the annular groove 18*a* to the outlet connection 18.

Together with the valve surface 42 formed on it and the associated valve seat 44, the second valve body 40 therefore forms the second seat valve 44 in the control valve 10. The second seat valve 44 is disposed between the inlet connection 16 and the outlet connection 18 and is normally open.

A compression spring 46 between the second valve body 40 and the valve housing 12 ensures that the valve surface 42 is not in contact with the valve seat 44 in the initial condition and that, therefore, the second seat valve 44 is normally open.

The valve surface 42 on the second valve body 40 points, axially, in the opposite direction to the valve surface 22 on the first valve body 20.

An armature plate 50 is fastened to the second valve body 40, for example by a bolt 48, in the axial extension of the two coaxial valve bodies 20 and 40. The armature plate 50 is located opposite to a magnet unit 52 with an electromagnet. The electromagnet can be activated by a non-illustrated control unit. When current is supplied to the magnet unit 52, the armature plate 50, and the second valve body 40 connected to it, are attracted axially in the direction of the magnet unit 52 against the action of the compression spring 46.

In the initial condition, which is represented in the drawing, the medium (oil or fuel) in a non-illustrated reservoir is in connection with the pressure intensifier in the injector via the inlet connection 16, the open second seat valve 44 with the valve body 40 and the outlet connection 18. In this condition, no current is supplied to the magnet unit 52 and the compression spring 26 presses the valve surface 22 on the first valve body 20 into its valve seat 24, whereas the compression spring 46 raises the valve surface 42 on the second valve body 40 from the valve seat 44. The transmission piston of the pressure intensifier is then located in the position in which it is extended downward.

The injection procedure is prepared by a supply of current to the magnet unit 52. The armature plate 50, which is bolted to the second valve body 40, is attracted by the magnet unit 52 so that, firstly, the valve surface 42 of the second valve body 40 comes into contact with its valve seat 44 and, by this, the second seat valve 44 in the control valve 10 is closed. The second valve body 40 subsequently entrains the first valve body 20, so that the valve surface 22 on the first valve body 20 is raised from its seat 24 and the first seat valve 24 in the control valve 10 opens. The transmission piston of the pressure intensifier is then connected to the return. A return spring (not shown) displaces the pressure medium to the return.

The termination of the flow of current to the magnet unit 52 introduces the beginning of the injection. Because of this, the armature plate 50 falls away again from the magnet unit 52 and the first seat valve 24 with the valve body 20 closes, whereas the second seat valve 44 with the valve body 40 between the inlet connection 16 and the outlet connection 18 opens. As in the initial condition, the system pressure is therefore again located on the transmission piston and displaces the fuel quantity stored in front of it via the injection line to the injection nozzle. The injection then terminates when the closing pressure of the nozzle is reached.

We claim:

1. A control valve for use in a fuel reservoir injection system having a fuel injector with a pressure intensifier fitted upstream of the control valve, the control valve comprising:

a housing having a valve chamber formed therein, an inlet connection, an outlet connection, and a return connection;

a first valve body disposed and axially movable within said valve chamber, said first valve body forming a first seat valve which can selectively create a fluid connection between said outlet connection and said return connection;

a second valve body forming a second seat valve, said first seat valve disposed between said outlet connection and said return connection and being normally closed, said second seat valve disposed between said inlet connection and said outlet connection and being normally open; and an armature plate and a magnet unit disposed opposite said armature plate, said second valve body being connected to said armature plate; wherein during an activation of said magnet unit, said second valve body moves first and closes said second seat valve before said first valve body moves, entrained by said second valve body, and opens said first seat valve.

2. The control valve according to claim 1, wherein said second valve body is disposed coaxially within said first valve body.

3. The control valve according to claim 1, wherein said fuel reservoir injection system operates within a diesel engine.

4. The control valve according to claim 1, further comprising a valve housing forming a valve seat for said first valve body, whereby said first valve body forms a valve seat for said second valve body.

5. The control valve according to claim 4, further comprising a compression spring for pressing said first valve body downward into contact with a corresponding valve seat.

6. The control valve according to claim 5, further comprising a second compression spring for keeping said second valve body downward and away from said corresponding valve seat.

* * * * *